United States Patent
Yoshihara et al.

[11] Patent Number: 5,943,999
[45] Date of Patent: Aug. 31, 1999

[54] MALFUNCTION DETERMINING APPARATUS OF AN EXHAUST GAS RECIRCULATION SYSTEM

[75] Inventors: Masatomo Yoshihara; Tokiji Ito, both of Toyota, Japan

[73] Assignee: Toyota Jidosha Kabushiki Kaisha, Aichi-ken, Japan

[21] Appl. No.: 08/872,469

[22] Filed: Jun. 10, 1997

[30] Foreign Application Priority Data

Jun. 12, 1996 [JP] Japan .................................. 8-151302

[51] Int. Cl.⁶ .................................................. F02M 25/07
[52] U.S. Cl. ................................... 123/568.16; 73/117.3
[58] Field of Search ....................... 123/568.16; 73/117.3

[56] References Cited

U.S. PATENT DOCUMENTS

| | | | |
|---|---|---|---|
| 4,723,528 | 2/1988 | Tamura | 73/116 |
| 4,834,054 | 5/1989 | Hashimoto et al. | 123/676 |
| 5,113,835 | 5/1992 | Seki et al. | 123/568.16 |
| 5,207,093 | 5/1993 | Maeda | 73/118.1 |
| 5,309,887 | 5/1994 | Kondo et al. | 123/568.16 |
| 5,508,926 | 4/1996 | Wade | 701/29 |
| 5,722,363 | 3/1998 | Iida et al. | 123/305 |
| 5,771,869 | 6/1998 | Yoshihara et al. | 123/568.16 |

FOREIGN PATENT DOCUMENTS

| | | |
|---|---|---|
| 4208133 | 10/1992 | Germany . |
| 3-57870 | 3/1991 | Japan . |
| 4-103865 | 4/1992 | Japan . |

OTHER PUBLICATIONS

Patent Abstracts of Japan, vol. 096, No. 008, Aug. 30, 1996 & JP 08 086248 A (Nissan Motor Co. Ltd.), Apr. 2, 1996.
Patent Abstracts of Japan, vol. 096, No. 002, Feb. 29, 1996 & JP 07 269392 A (Suzuki Motor Corp), Oct. 17, 1995.

*Primary Examiner*—Andrew M. Dolinar
*Assistant Examiner*—Arnold Castro
*Attorney, Agent, or Firm*—Kenyon & Kenyon

[57] ABSTRACT

A malfunction determining apparatus of an exhaust gas recirculation system can prevent an erroneous determination that an exhaust gas recirculating valve is normal when the valve has a cause of malfunctioning. The exhaust gas recirculating valve is provided between an exhaust passage and an intake passage of an internal combustion engine of a vehicle. An operation determining part determines whether the exhaust gas recirculating valve has been operated at least once. A malfunction determining part performs a determination as to whether the exhaust gas recirculation system is malfunctioning. The determination is performed after the exhaust gas recirculating valve has been operated at least once.

6 Claims, 11 Drawing Sheets

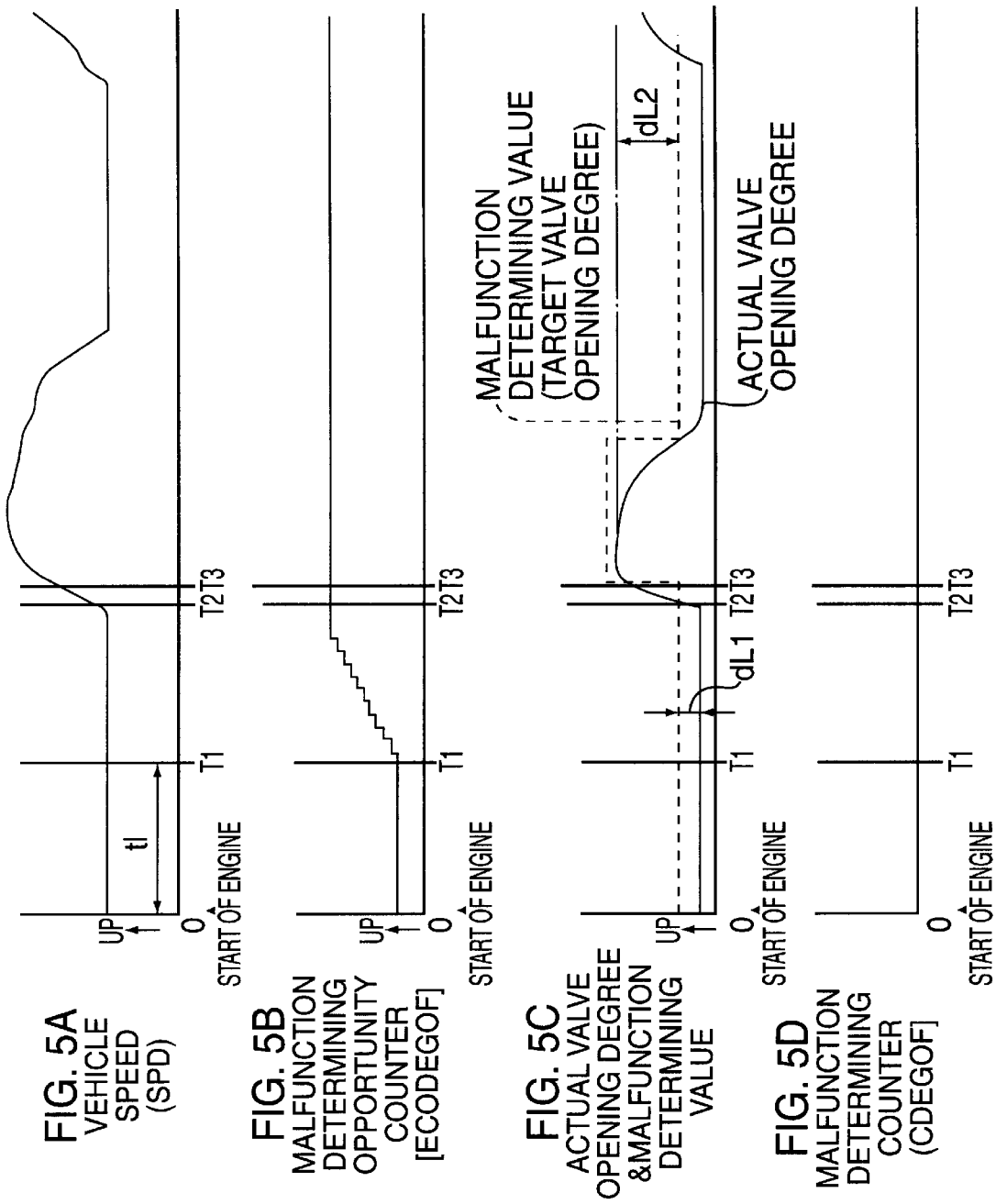

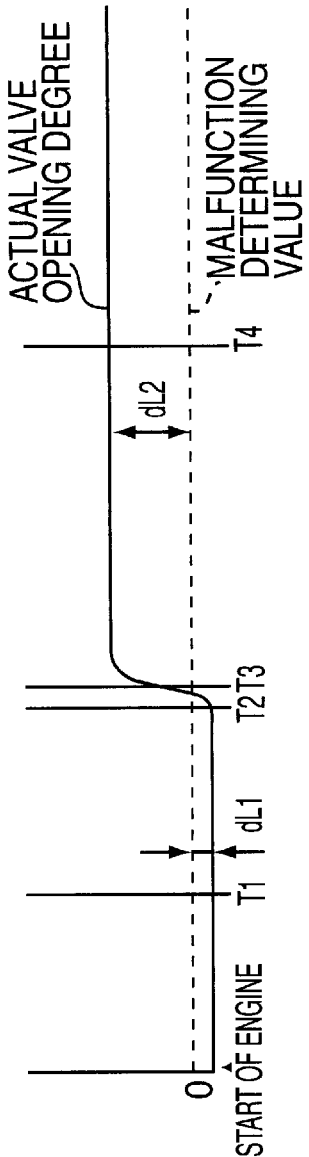
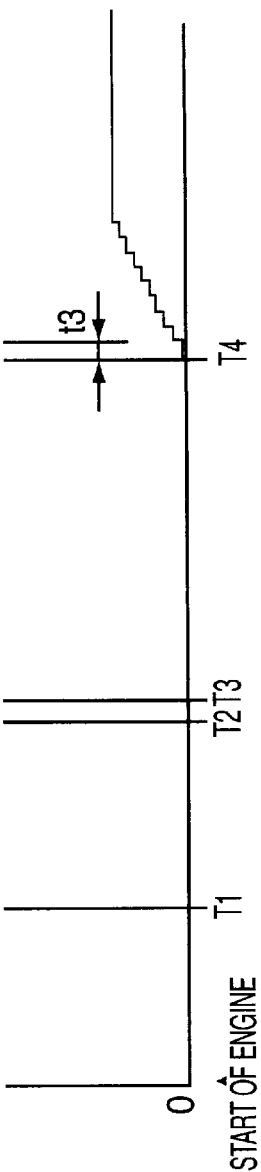
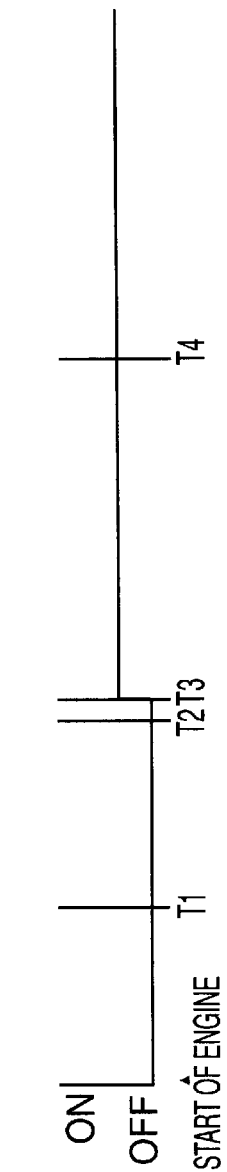
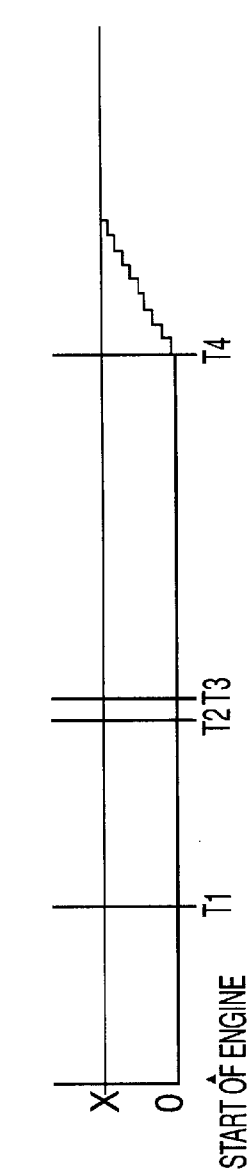
FIG. 6A LIFT SENSOR OUTPUT
FIG. 6B MALFUNCTION DETERMINING OPPORTUNITY CENTER [ECDEGOF]
FIG. 6C EGRON HISTORY FLAG [XJEGON]
FIG. 6D MALFUCTION DETERMINING COUNTER [CDEEGOF]

VEHICLE SPEED
[SPD]

IDLON COUNTER

TARGET VALVE
OPENING DEGREE
[ETLIFTD]

TARGET VALVE
OPENING DEGREE
BLUNTED VALUE
[ETLIFTDD]

ACTUAL VALVE
OPENING
DEGREE
[ELIFTD]

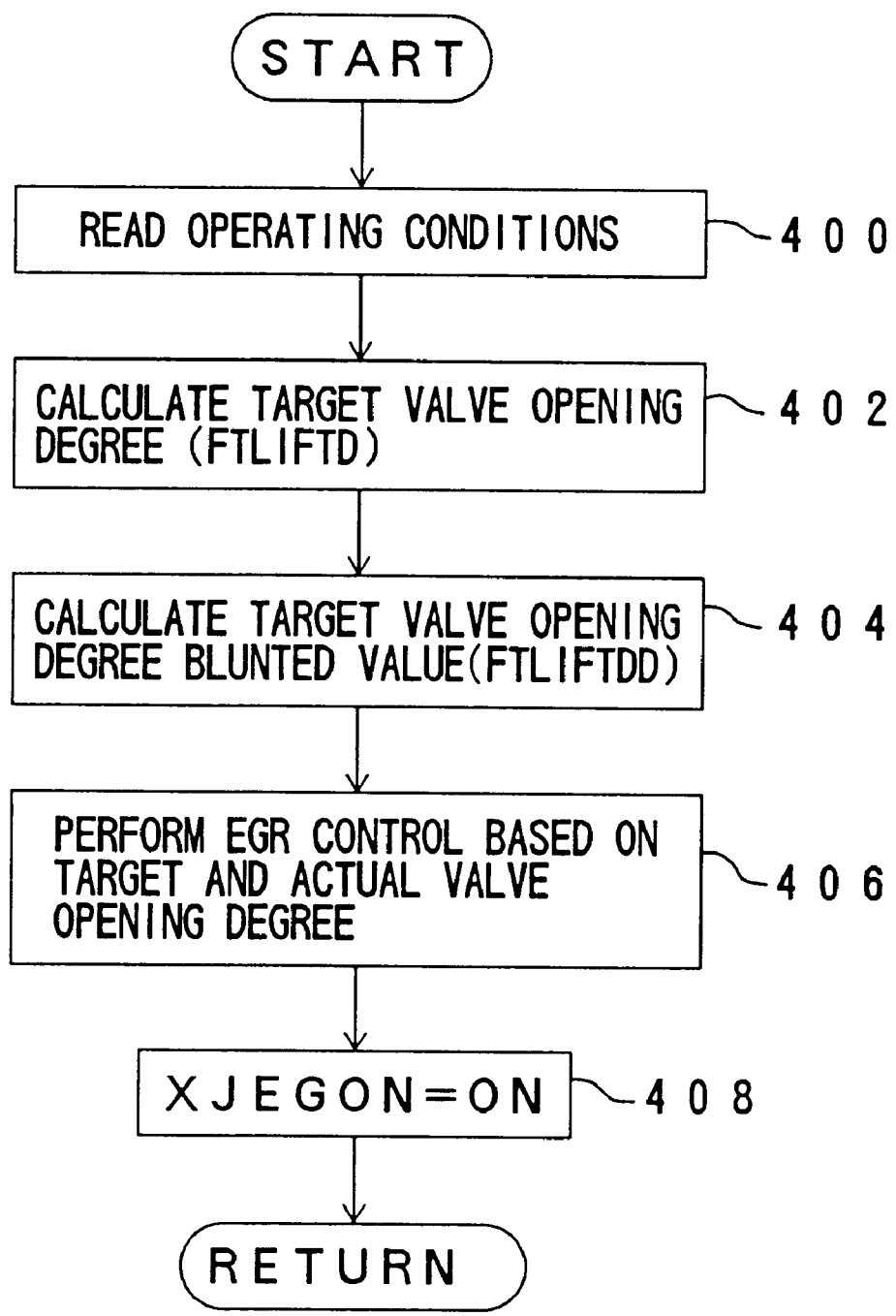

MALFUNCTION DETERMINING APPARATUS OF AN EXHAUST GAS RECIRCULATION SYSTEM

BACKGROUND OF THE INVENTION

1. Field of the Invention

The present invention relates to a malfunction determining apparatus of an exhaust gas recirculation system and, more particularly, to a malfunction determining apparatus of an exhaust gas recirculation system which detects a malfunction of an EGR valve of the exhaust gas recycling system.

2. Description of the Related Art

An exhaust gas recirculation system (hereinafter referred to as an EGR) is known as means for purifying exhaust gas of an internal combustion engine (hereinafter referred to as an engine). The EGR reduces NOx by recirculating a part of exhaust gas to an intake line.

In an engine having the EGR, since the amount of smoke is increased as the recirculation rate (a ratio of an exhaust gas to a fresh gas) is increased, the amount of recirculation of exhaust gas cannot be increased beyond a certain limit. Additionally, since the amount of smoke tends to be increased as the load of the engine is increased, a target exhaust gas recirculation rate is varied in response to operating conditions of the engine by providing an exhaust gas recirculating valve (EGR valve) in an exhaust gas recirculation passage. An open/close operation of the EGR valve is controlled in response to the target exhaust gas recirculation rate so that the maximum recirculation of exhaust gas can be achieved within a range in which an excessive amount of smoke is not generated.

In a case where the above-mentioned EGR valve is fixed in an open state due to malfunctioning, exhaust gas is continuously recirculated to an intake line. This may increase the amount of smoke and cause an engine stall. Accordingly, a malfunction determining apparatus has been suggested to detect a malfunction of the EGR.

A malfunction determining apparatus of the above-mentioned type is disclosed in Japanese Laid-Open Patent Application No. 4-103865. The malfunction determining apparatus of the EGR disclosed in the above-mentioned publication detects an actual degree of opening of the EGR valve (actual valve opening degree), and sets a target opening degree of the valve in response to an operating condition of the engine. It is determined that a malfunction occurs in the EGR when a difference between the actual valve opening degree and the target opening degree is greater than a predetermined value.

The above-mentioned EGR valve is operated by a pressure supplied by a vacuum switching valve (duty-VSV) which is controlled by an EGR computer to switch the pressure between a negative pressure in an intake pipe and an atmospheric pressure with a variable duty ratio. Thus, if atmospheric air passage of the duty-VSV is clogged, the atmospheric air cannot be introduced into the EGR valve. Accordingly, since a negative pressure in the EGR valve cannot be released, the EGR valve is maintained in an open state which results in a close malfunction state.

However, when the EGR valve is not operated for a certain time period, air is gradually introduced through the atmospheric air passage and thus the EGR valve is closed. In a state where the EGR valve is not operated, the target valve opening degree is set to zero. Additionally, when the EGR valve is closed due to introduction of air through the atmospheric air passage as mentioned above, the actual valve opening degree is also zero.

Accordingly, if a determination of malfunctioning is performed in such a state, the difference between the actual valve opening degree and the target valve opening degree is less than a predetermined value. Thus, there is a problem in that an erroneous determination is made that the EGR valve is normal even though the EGR valve has a cause of malfunctioning due to the atmospheric air passage being clogged.

SUMMARY OF THE INVENTION

It is a general object of the present invention to provide an improved and useful malfunction determining apparatus of an exhaust gas recirculation system in which the above-mentioned problems are eliminated.

A more specific object of the present invention is to provide a malfunction determining apparatus of an exhaust gas recirculation system which can prevent an erroneous determination that the EGR valve is normal even though the EGR valve is actually malfunctioning.

In order to achieve the above-mentioned objects, there is provided according to the present invention a malfunction determining apparatus of an exhaust gas recirculation system having an exhaust gas recirculating valve provided between an exhaust passage and an intake passage of an internal combustion engine of a vehicle, the malfunction determining apparatus comprising:

operation determining means for determining whether the exhaust gas recirculating valve has been operated at least once; and malfunction determining means for performing a determination as to whether the exhaust gas recirculation system is malfunctioning, the determination of malfunctioning being performed after the exhaust gas recirculating valve has been operated at least once.

According to the above-mentioned invention, the determination of malfunctioning is performed after the exhaust gas recirculating valve has been operated at least once. When the exhaust gas recirculating valve is operated at least once and if the exhaust gas recirculating valve has a cause of malfunctioning, the exhaust gas recirculating valve maintains an open state after operation. Accordingly, an accurate determination of malfunctioning can be made by performing the malfunction determining process when a malfunction actually occurs in the exhaust gas recirculating valve.

The malfunction determining apparatus according to the present invention may further comprises a start condition determining part which determines an appropriate condition to start a malfunction determining process to make the determination of malfunctioning based on operating conditions of the internal combustion engine and the vehicle. Accordingly, the malfunction determining process can be started in a condition in which an accurate determination of malfunctioning can be performed.

The start condition determining part may determine whether the internal combustion engine has been operated for a predetermined period so as to start the malfunction determining process after the internal combustion engine has been operated for the predetermined period.

Additionally, the start condition determining part may determine whether the internal combustion engine is in an idle operation and the vehicle is in a stopped state so as to start the malfunction determining process when the internal combustion engine is in an idle operation and the vehicle is in the stopped state.

Further, the start condition determining part may determine whether a temperature of the cooling water of the internal combustion engine is equal to or greater than a predetermined temperature so as to start the malfunction determining process when the temperature of the cooling water of the internal combustion engine is equal to or greater than the predetermined temperature.

Additionally, the start condition determining part may determine whether the exhaust gas recirculating valve is controlled to be in a closed state so as to start the malfunction determining process when the exhaust gas recirculating valve is controlled to be in the closed state.

Other objects, features and advantages of the present invention will become more apparent from the following detailed description when read in conjunction with the accompanying drawings.

BRIEF DESCRIPTION OF THE DRAWINGS

FIG. 5 is a timing chart for explaining a conventional start condition determining process;

FIG. 6 is a timing chart for explaining the start condition determining process according to the embodiment;

FIG. 11 is a flowchart of an EGR control process.

DETAILED DESCRIPTION OF THE PREFERRED EMBODIMENT

A description will now be given, with reference to the drawings, of the invention.

Figure 1:
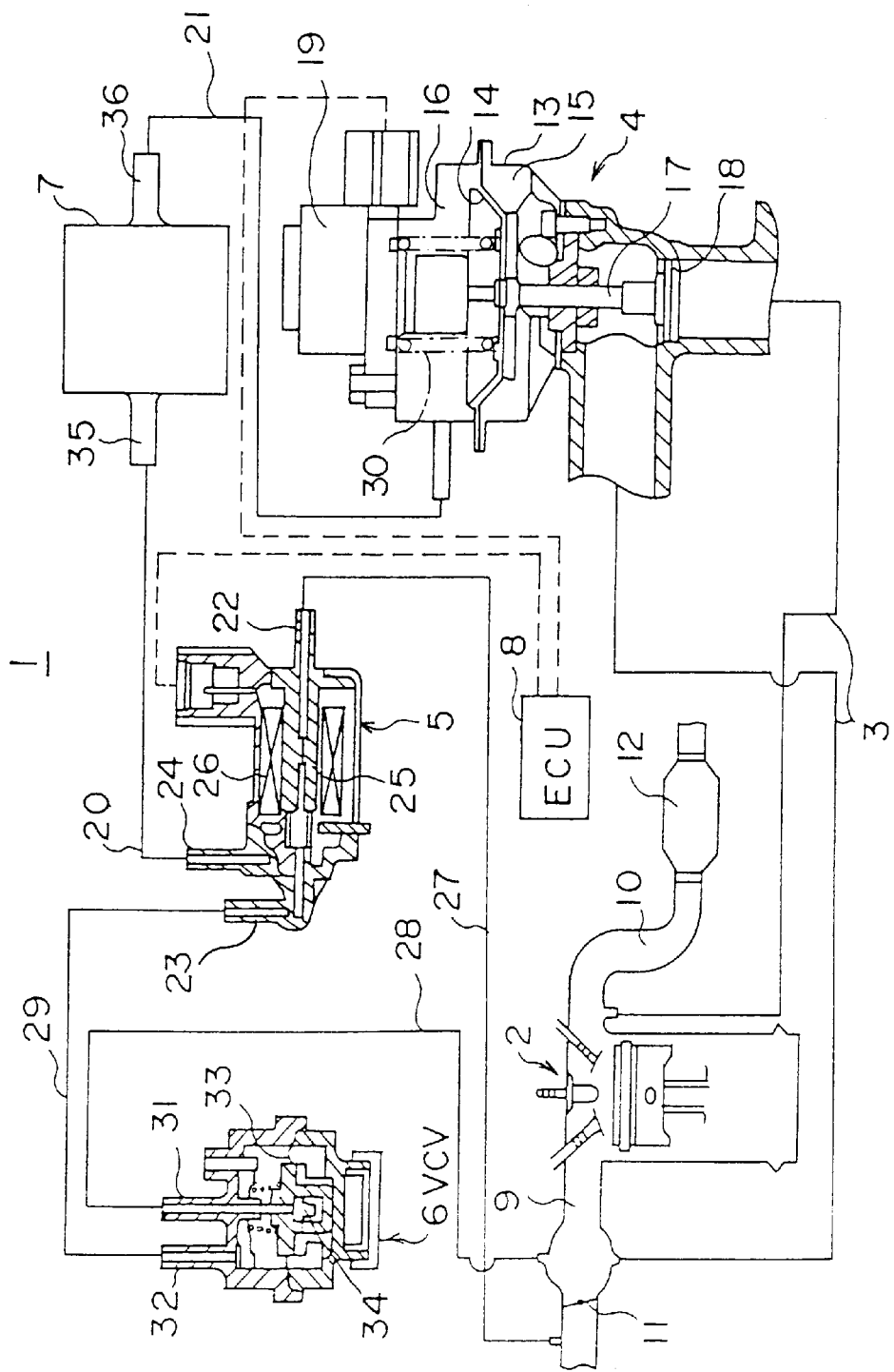
FIG. 1 is an illustration of a structure of an exhaust gas recirculation system provided with a malfunction determining apparatus according to an embodiment of the present invention.

FIG. 1 is an illustration of a structure of an exhaust gas recirculation system 1 (hereinafter referred to as EGR) provided with a malfunction determining apparatus according to an embodiment of the present invention. In the present embodiment, the EGR 1 is provided to an internal combustion engine 2 (hereinafter referred to as engine).

The EGR 1 comprises an exhaust gas recirculating passage 3, an exhaust gas recirculating valve 4 (hereinafter referred to as EGR valve), a vacuum switching valve 5 (hereinafter referred to as VSV), a vacuum control valve 6 (hereinafter referred to as VCV), a vacuum tank 7 and an electronic control unit 8 (hereinafter referred to as ECU).

An intake passage 9 is connected to an intake port of the engine 2. An exhaust passage 10 is connected to an exhaust port of the engine. Additionally, a throttle valve 11, which is operated in accordance with the amount of depression of an acceleration pedal, is provided in the intake passage 9. A three-way catalytic converter 12 is provided in the exhaust passage 10 to decrease the amount of harmful components such as HC (hydrocarbon), CO (carbon monoxide) and NOx (nitrogen oxides) in the exhaust gas.

The exhaust gas recirculating passage 3 is provided between the intake passage 9 and the exhaust passage 10 as a bypass passage. An end of the exhaust gas recirculating passage 3 is connected to the downstream side of the throttle valve 11 of the intake passage 9. An opposite end of the exhaust gas recirculating passage 3 is connected to the upstream side of the three-way catalytic converter 12 of the exhaust passage 3. Thus, the intake passage 10 is connected to the exhaust passage 9 by the exhaust gas recirculating passage 3.

The EGR valve 4 is provided in the middle of the exhaust gas recirculating passage 3. The interior of the EGR valve 4 is divided into an atmospheric pressure chamber 15 and a diaphragm chamber 16 by a diaphragm 14 provided in a casing 13. A valve shaft 17 is connected to the diaphragm 14. A valve body 18 is provided to a lower end of the valve shaft 18 so as to open and close the exhaust gas recirculating passage 3. The above-mentioned atmospheric chamber 15 is open to the atmosphere. The diaphragm chamber 16 is connected to the VSV 5 via negative pressure introducing pipes 21 and 20 and the vacuum tank 7.

The diaphragm 14 is urged downwardly in the figure by a coil spring 30 provided in the diaphragm chamber 16. The diaphragm 14 moves upwardly when a negative pressure is introduced into the diaphragm chamber 16 from the VSV 5. Accordingly, the valve body 18 is moved upwardly by the upward movement of the valve shaft 17 connected to the diaphragm 14 which causes the EGR valve to open. The degree of opening of the EGR valve 4 is controllable by the negative pressure introduced into the diaphragm chamber 16.

As mentioned above, the intake passage 9 and the exhaust passage 10 are connected to each other when the EGR valve 4 is open. Thus, exhaust gas flowing in the exhaust passage 10 is returned to the intake passage 9. Additionally, the amount of exhaust gas returned from the exhaust passage 10 to the intake passage 9 can be controlled by controlling the degree of opening of the EGR valve 4.

The valve shaft 17 extends above the diaphragm 14. The extended portion of the valve shaft 17 is connected to a lift sensor 19 provided in an upper portion of the casing 13. The lift sensor 19 is a position meter using a resistor. The lift sensor functions as means for detecting an actual degree of opening (an actual state of valve operation) of the EGR valve 4.

Specifically, the lift sensor 19 comprises a contact brush connected to the valve shaft 17 and a resistor placed in contact with the contact brush. The degree of opening of the valve body 18 is detected by measuring a voltage which varies in response to a position of the contact brush where the contact brush is in contact with the resistor. The voltage representing a degree of opening of the EGR valve 4 which is detected by the lift sensor 19 and is supplied to the ECU 8.

The VSV 5 has a function to control the negative pressure to be introduced into the EGR valve 4. The VSV 5 comprises an atmospheric air port 22, a negative pressure introducing port 23, an output port 24, a spool 25 and a coil 26.

The atmospheric air port 22 is connected to the upstream side of the throttle valve 11 of the intake passage 9 via an atmospheric pressure introducing pipe 27 so as to introduce atmospheric air into the VSV 5. The negative pressure introducing port 23 is connected to the downstream side of the throttle valve 11 of the intake passage 9 via negative pressure introducing pipes 28 and 29 and the VCV 6 so as to introduce a negative pressure into the VSV 5. The output port 24 is connected to the diaphragm chamber 16 of the EGR valve 4 via the negative pressure introducing pipes 20 and 21 and the vacuum tank 7.

Additionally, the coil 26 is electrically connected to the ECU 8. The coil 26 is excited by a drive signal (duty signal) supplied by the ECU 8 so that the spool 25 is moved leftwardly and rightwardly in the figure. The output port 24 is selectively connected to the atmospheric air port 22 or the negative pressure introducing port 23 by the movement of the spool 25. Since the movement of the spool 25 can be controlled by a duty ratio of the duty signal supplied by the ECU 8, the level of the negative pressure introduced into the EGR valve 4 can be controlled. That is, a degree of opening of the EGR valve 4 is controlled by controlling an operation of the VSV 5 by the ECU 8.

The VCV 6 has an input port 31 and an output port 32. The input port 31 id connected to the intake passage 9 via the negative pressure pipe 28. The output port 32 is connected to the negative pressure introducing port 23 of the VSV 5 via the negative pressure introducing pipe 29. The VCV 6 includes a diaphragm 33 and a valve body 34 therein. The valve body 34 opens and closes by movement of the diaphragm 33. The diaphragm is moved in response to a level of the negative pressure of the intake line which is introduced into the input port 31. The valve body 34 is opened and closed in response to the movement of the diaphragm 33, and thereby the negative pressure output from the output port 32 is adjusted. Accordingly, the negative pressure at the output port 32 of the VCV 6 is maintained at a constant level irrespective of fluctuation of the negative pressure in the intake line.

An input port 35 of the vacuum tank 7 is connected to the output port 24 of the VSV 5 via the negative pressure introducing pipe 20. An output port of the vacuum tank 7 is connected to the diaphragm chamber 16 of the EGR valve 4 via the negative pressure introducing pipe 21. The vacuum tank 7 has a relatively large volume so that the vacuum tank 7 removes pulsations when the negative pressure output from the VSV5 includes such pulsations.

It should be noted that, although not shown in FIG. 1, an ignition switch 37 which detects and enables starting of the engine 2, a water temperature sensor 38 which detects a cooling water temperature THW of the engine 2, a vehicle speed sensor 39 which detects a speed SPD of the vehicle and a throttle switch 54 which detects a completely closed state of the throttle valve 11 are connected to the ECU 8 in addition to the lift sensor 19.

Figure 2:
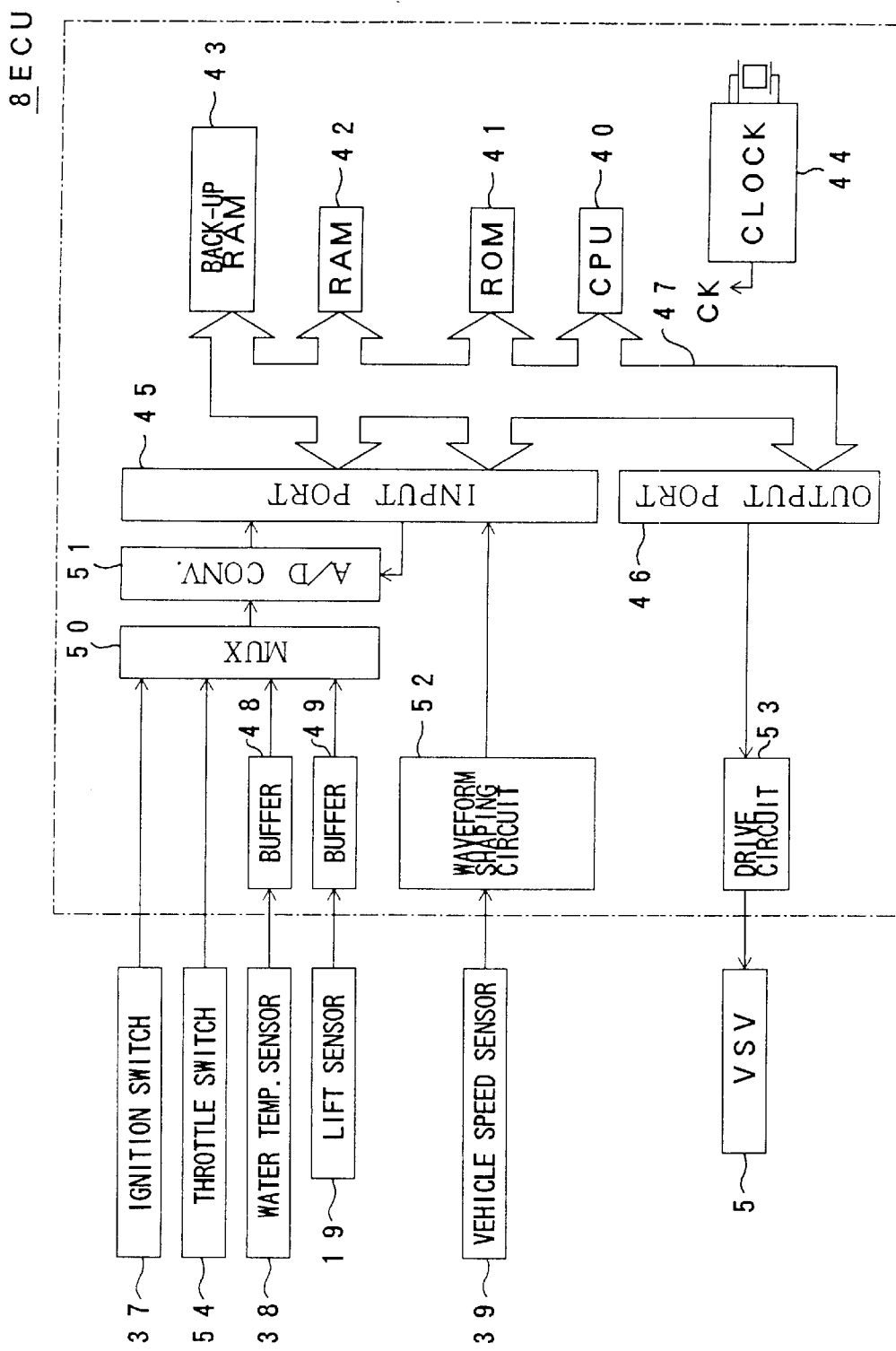
FIG. 2 is a block diagram showing a structure of the malfunction determining apparatus according to the embodiment of the present invention.

A description will now be given, with reference to FIG. 2, of the above-mentioned ECU 8. The ECU 8 comprises a logic operation circuit including a central processing unit (CPU) 40, a read only memory (ROM) 41 which stores predetermined control programs and maps, a random access memory (RAM) 42 which temporarily stores calculation results of the CPU 40, a back-up RAM 43 which stores predetermined data, a clock generator (CLOCK) 44 which generates a predetermined clock signal, and a bus 47 which connects an input port 45 and an output port 46 to each component.

The above-mentioned lift sensor 19, the ignition switch 37, the water temperature sensor 38, the vehicle speed sensor 39 and the throttle switch 54 are connected to the input port 45 via buffers 48 and 49, a multiplexer 50, an A/D converter 51 and a waveform shaping circuit 52. The CPU 40 reads detection signals of each sensor 19 and 37–39 which are input via the input port 54. Additionally the VSV 5 is connected to the output port 46 via a drive circuit 53. In this structure, the CPU 40 controls VSV 5 based on the input from each of the sensors 19 and 37–39, and performs a malfunction determining process as a part of the present invention described below.

Figure 3:
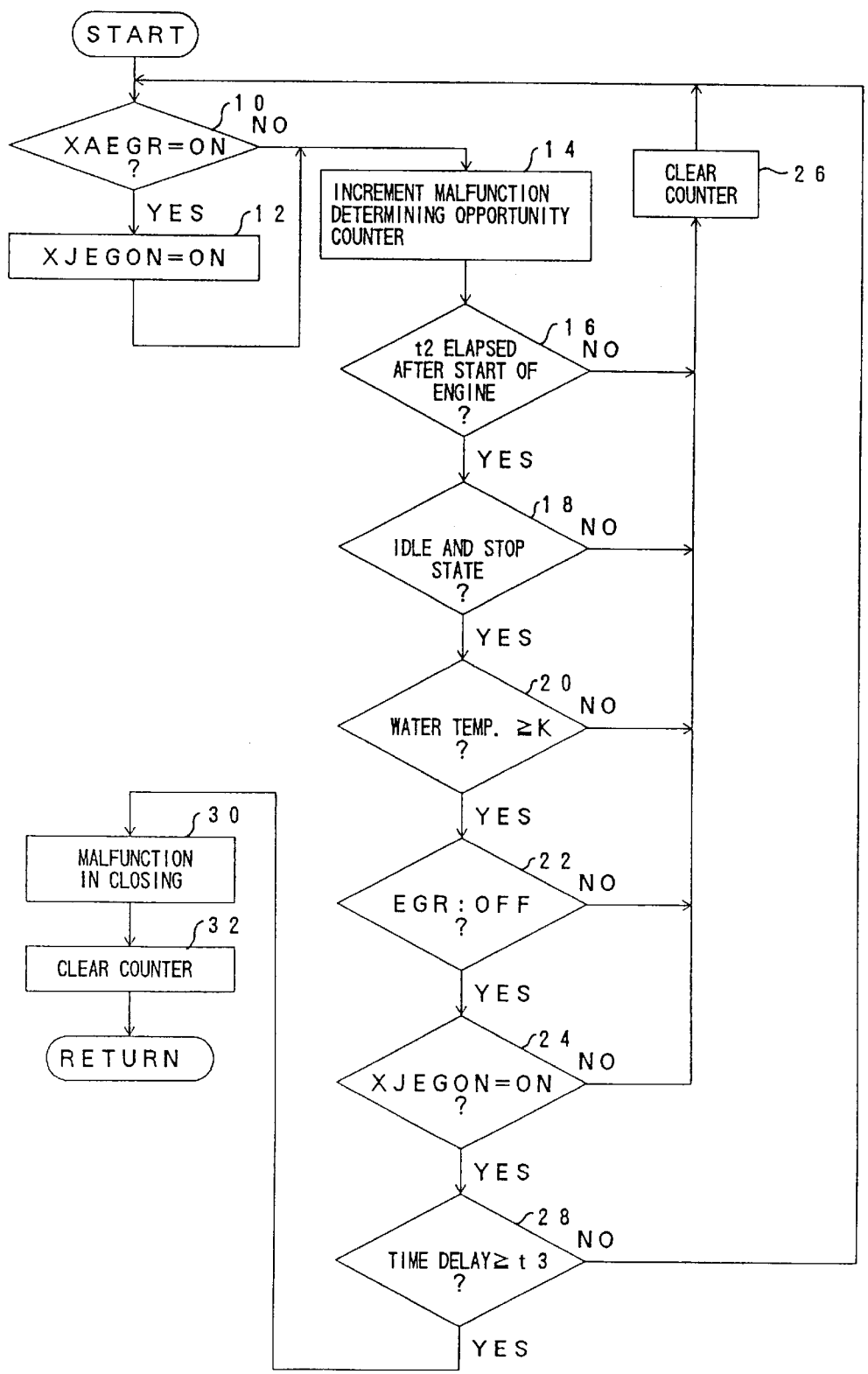
FIG. 3 is a flowchart showing a start condition determining process which is performed by the ECU provided in the malfunction determining apparatus according to the embodiment of the present invention.
Figure 4:
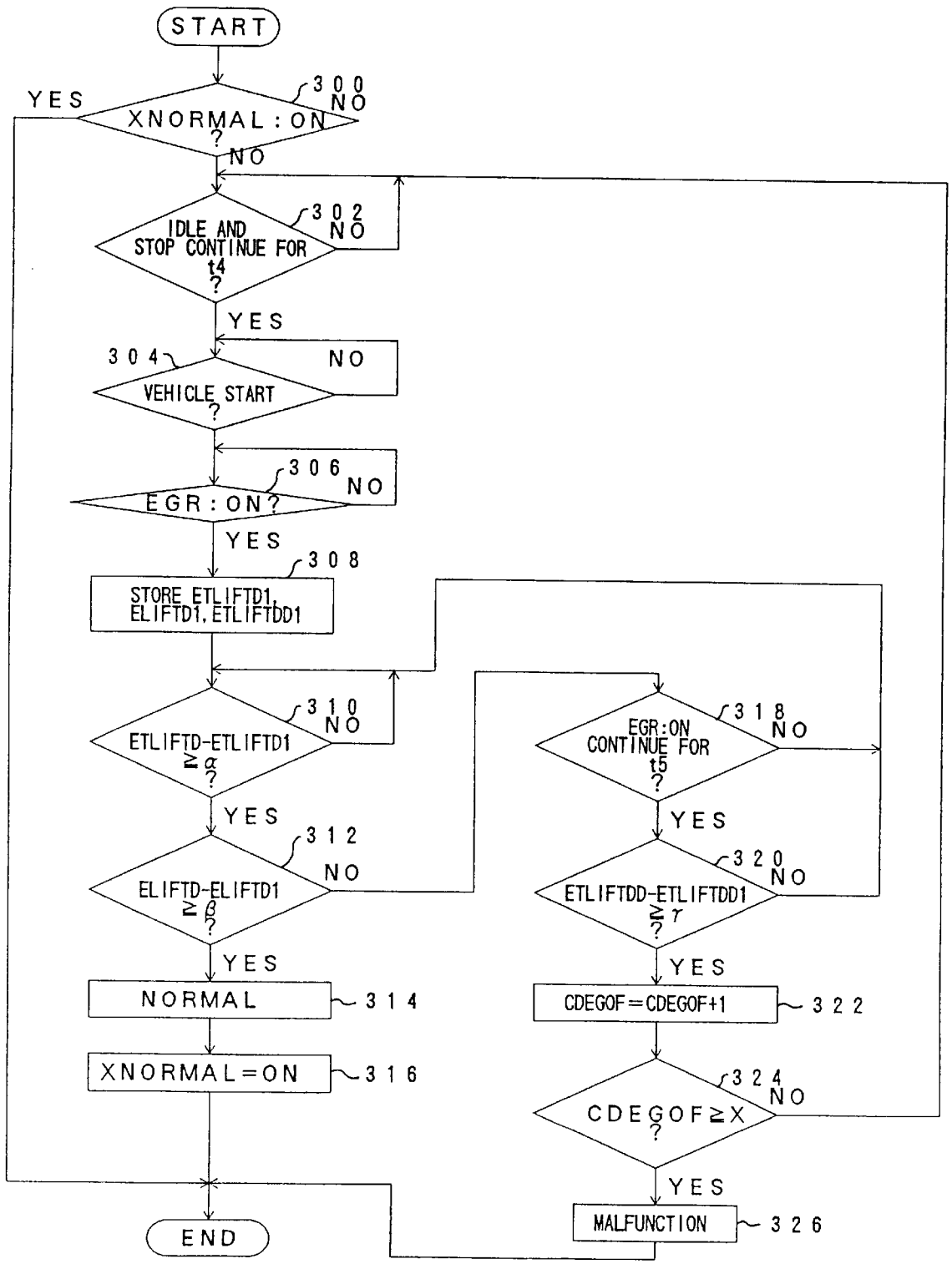
FIG. 4 is a flowchart showing the malfunction determining process which is performed by the ECU provided in the malfunction determining apparatus according to the embodiment of the present invention.
Figure 7A:
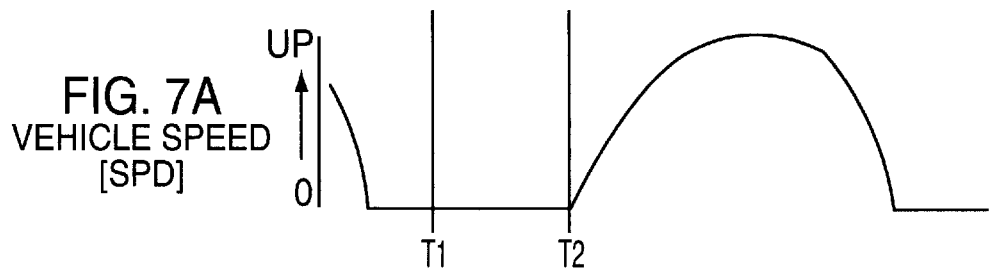
FIG. 7 is a timing chart for explaining the malfunction determining process according to the present invention.
Figure 7B:
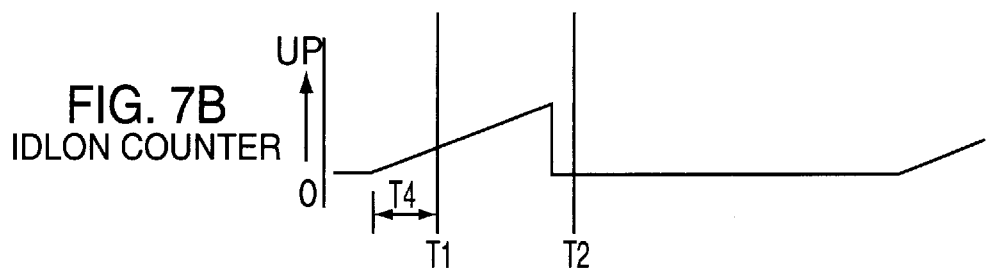
Figure 7C:
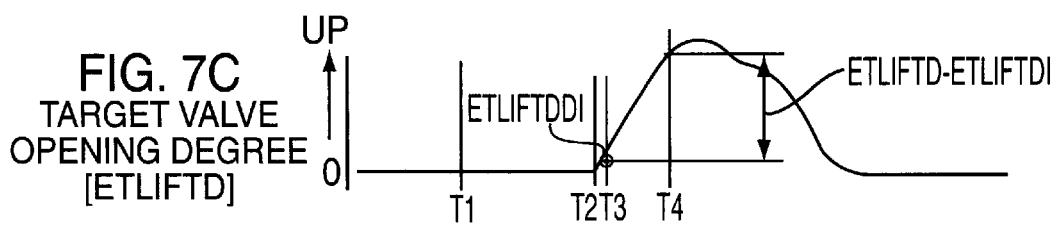
Figure 7D:
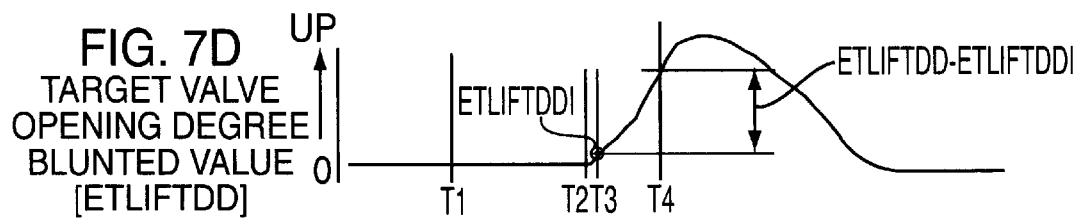
Figure 7E:
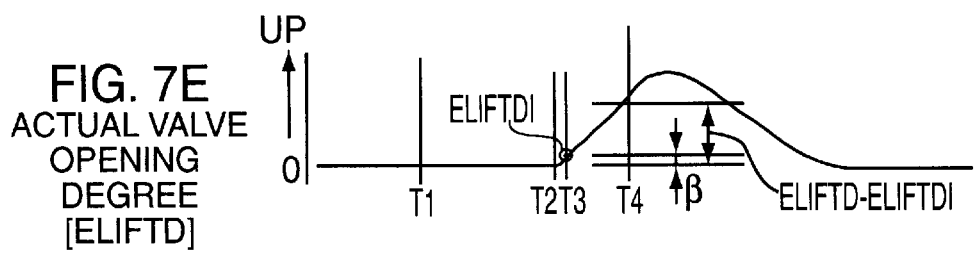

A description will now be given, with reference to FIGS. 3 to 10, of the malfunction determining process performed by the EGR 1. The malfunction determining process related to the present embodiment is performed to determine an occurrence of a malfunction (closing malfunction) in which the valve body 18 of the EGR 1 stays in an open position. FIG. 3 is a flowchart showing a start condition determining process for determining a start condition which provides a start time of the malfunction determining process. FIG. 4 is a flowchart showing a malfunction determining process which is performed when the start time of the malfunction determining process is determined by the start condition determining process.

A description will given below of the start time determining process of the malfunction determining process.

Prior to the description of the start condition determining process shown in FIG. 3, a description will be given first, with reference to FIGS. 5 and 6, of the principle of the start condition determining process. FIG. 5 is a timing chart of the EGR 1 shown in FIG. 1 when the EGR 1 is operated in accordance with a conventional start condition determining process. FIG. 6 is a timing chart when the EGR 1 is operated in accordance with the start condition determining process according to the present embodiment.

Reference is made to the conventional start condition determining process shown in FIG. 5. Conventionally, the start time of the malfunction determining process is set irrespective of the presence of an operational history of the EGR valve 4 as mentioned above. Specifically, the malfunction determining process is started immediately at a time (time T1) when a predetermined time period t1 elapses after the engine is started.

It is assumed that the vehicle starts to move at a time T2, and, consequently, an operation of the EGR 1 is started at a time T3 (T3>T1) as shown in FIG. 5-(A). In such a case, there is a possibility that the malfunction determining process is completed before the EGR valve 4 is operated if a long time is taken for the vehicle to start to move.

Reference is now made to the actual valve opening degree of the EGR valve 4 indicated by a solid line and a malfunction determining value calculated by the ECU 8 indicated by a dashed line in FIG. 5-(C). In the conventional malfunction determining process, the target valve opening degree which is calculated by the ECU 8 corresponds to the malfunction determining value. As shown in FIG. 5-(C), the malfunction determining value calculated by the ECU 8 is set to a small value since the engine 2 is in an idle state at the time T1 when the malfunction determining process is started.

If it is assumed that the atmospheric air port 22 of the VSV 5 is clogged by ice, atmospheric air cannot be introduced into the diaphragm chamber 16 of the EGR valve 4. This results in a closing malfunction state in which the EGR valve 4 cannot be closed. However, even though the EGR valve 4 has the above-mentioned malfunctioning factor, the EGR valve 4 may be gradually closed by air introduced through the atmospheric air port 22 when the EGR 4 is not operated for a considerable time period.

Accordingly, if the malfunction determining process is performed before the EGR valve is operated, the difference (indicated by dL1 in the figure) between the malfunction determining value and the actual valve opening degree is reduced to less than a predetermined value. This leads to the erroneous determination by the ECU 8 that the operation of the EGR valve 4 is normal.

Specifically, as shown in FIG. 5-(B), when the malfunction determining process is started at the time T1, a malfunction determining opportunity counter ECDEGOF starts to operate so that the malfunction determining process is started each time the malfunction determining opportunity counter ECDEGOF is incremented. However, before the EGR valve 4 starts to operate as mentioned above, the difference dL1 between the malfunction determining value and the actual valve opening degree is less than a predetermined value and, thus, the malfunction determination is not performed. Accordingly, a malfunction determining counter CDEGOF, which is incremented each time the malfunction determination is performed, remains at zero as shown in FIG. 5-(D). Thus the ECU 8 erroneously determines that the operation of the EGR valve 4 is normal.

When the operation of the EGR 1 is started at the time T3 under this condition, the EGR valve 4 stays in an open state as indicated by a single dashed chain line of FIG. 5-(C) since the atmospheric air port 22 is clogged. This causes malfunctioning of the EGR 4. In this state, the difference between the malfunction determining value and the actual valve opening degree becomes large as indicated by dL2.

Accordingly, the ECU 8 perform an EGR control process based on the determination that the operation of the EGR 4 is normal in accordance with the result of the malfunction determining process which was performed before the EGR valve 4 is operated.

On the other hand, in the start condition determining process according to the present embodiment, the malfunction determination is performed after the EGR valve 4 is operated. A description will now be given, with reference to FIG. 6, of the start condition determining process according to the present invention.

In the start condition determining process according to the present embodiment, an EGRON history flag XJEGON is provided which is set when the EGR valve 4 is operated to open (EGR ON) as shown in FIG. 6-(C). The execution of the malfunction determining process is prohibited until the EGRON history flag XJEGON is set, that is, until the time T3 is reached. Thus, the malfunction determining process is performed after the EGRON history flag XJEGON is set, that is, after the time T3 is reached. In the example shown in FIG. 6, the malfunction determining process is performed at a time T4.

By executing the malfunction determining process after the EGR valve 4 is operated, a reliable detection of malfunction can be made even when the VSV 5 has a cause of malfunction as in the case where the atmospheric air port 22 is frozen. That is, the EGR valve 4 is maintained in the closed state after the time T3 when the EGR valve 4 is operated since the atmospheric air is not introduced from the VSV 5. Thus, determination of an occurrence of malfunction is made under the condition in which the EGR valve 4 is malfunctioning by executing the malfunction determining process after the EGR valve 4 was operated, that is, after the EGRON history flag XJEGON was set. Thus, the ECU 8 can positively determine the occurrence of malfunction in the EGR valve 4.

Specifically, as shown in FIG. 6-(B), when the malfunction determining process is started at the time T4, the operation of the malfunction determining opportunity flag ECDEGOF is started. The malfunction determining process is executed each time the malfunction determining opportunity counter ECDEGON is incremented. However, after the EGR valve 4 has started, the difference dL2 between the malfunction determining value and the actual valve opening degree is greater than a predetermined value. Thus, the ECU 8 performs the malfunction determining process, and thereby the malfunction determining counter CDEGOF is incremented. In the present embodiment, the final determination of the occurrence of malfunction (final malfunction determining process) is performed when the malfunction determining counter CDEGOF becomes equal to 10 (CDEGOF=10).

It should be noted that the malfunction determining opportunity counter ECDEGOF is provided and the final malfunction determination is performed when a malfunction is detected a plurality of consecutive times (to times in this embodiment) because it is possible that an erroneous determination is made due to an external disturbance when the final malfunction determination is made by performing the malfunction determination only once.

Additionally, in the present embodiment, an amount of lift ELIFTD1 at the time T3 when an operation of the EGR 1 is started is used as the malfunction determining value. The reason for this will be described later.

A description will now be given, with reference to the flowchart of FIG. 3, of the start condition determining process of the malfunction determining process which is performed based on the above-mentioned principle.

When the malfunction determining process is started, first it is determined, in step 10, whether or not an EGR start flag XAEGR is set. The EGR start flag XAEGR is a flag which is set when an operation of the EGR 1 is started by the ECU 8. The EGR start flag XAEGR is set in an exhaust gas recirculation control process (hereinafter referred to as EGR control process) which is separately performed from the malfunction determining process shown in FIG. 11.

If an affirmative determination is made in step 10, the process proceeds to step 12 where the EGRON history flag XJEGON is set (XJEGON=ON). Accordingly, it can be determined by checking a state of the EGRON history flag XJEGON whether the EGR 1 was operated at least one time and consequently the EGR valve 4 was operated at least one time. That is, the operation history of the EGR valve 4 can be known by checking the state of the EGRON history flag XJEGON.

The EGRON history flag XJEGON is cleared when the ignition switch 37 is turned off. That is, if the EGRON history flag XJEGON is set once, the set state (XJEGON=0) of the flag XJEGON (XJEGON=ON) is maintained until the engine 2 is stopped. Accordingly, when an operation of the EGR 1 was started and, thereafter, the operation of the EGR 1 is stopped due to an operating condition of the engine 2, the EGRON history flag XJEGON is maintained in the set state.

When the process of the step 12 is completed, or when a negative determination is made in step 10, the process proceeds to step 14. In step 14, above-mentioned malfunction determining opportunity counter is incremented by one count (refer to FIG. 6(B)).

In the successive steps 16–24, processes for determining whether or not the condition of the engine 2 is appropriate for determining an occurrence of malfunction. In step 16, it is determined whether or not the predetermined time period t2 has elapsed, Means for measuring the predetermined time period t2 are provided by using the clock 44 in the ECU 8 (refer to FIG. 2) and providing a counter which is started when the ignition switch 37 is turned on.

If a negative determination is made in step 16, the engine 2 is in a state immediately after start where the predetermined time period has not elapsed after the starting. In the state immediately after start, it is possible that the engine 2 is in an unstable condition, and thus it is not appropriate to perform the malfunction determining process. Thus, if the negative determination is made in step 16, the process proceeds to step 26 so as to clear the malfunction determining opportunity counter ECDEGOF, and then the process is returned to step 10.

On the other hand, if an affirmative determination is made in step 16, the process proceeds to step 18 where it is determined whether or not the engine 2 is in an idle state and also if movement of the vehicle is stopped. It can be detected by an output signal of the throttle switch 54 whether or not the engine 2 is in an idle state. It can be detected by an output signal of the vehicle speed sensor 39 whether or not the vehicle is in a stopped state.

If a negative determination is made in step 18, this means that the vehicle is in a moving state. In the moving state of the vehicle, it is possible that operating conditions of the engine 2 change. Thus, it is not appropriate to determine occurrence of a malfunction. Thus, if the negative determination is made in step 18, the process proceeds to step 26 so as to clear the malfunction determining opportunity counter ECDEGOF, and then the process is returned to step 10.

On the other hand, if an affirmative determination is made in step 18, the process proceeds to step 20 where it is determined whether or not the cooling water temperature THW is greater than a predetermined temperature k. The cooling water temperature THW can be detected by an output signal of the water temperature sensor 38.

If a negative determination is made in step 20, the engine 2 is not sufficiently warmed-up. In such a cool state, it is possible that the operation of the engine 2 is not stable. Thus, it is not appropriate to perform a determination of occurrence of malfunction. Accordingly, if the negative determination is made in step 20, the process proceeds to step 26 so as to clear the malfunction determining opportunity counter ECDEGOF, and then the process is returned to step 10.

On the other hand, if an affirmative determination is made in step 20, the process proceeds to step 22 where it is determined whether or not the ECU 8 outputs a start signal so as to start operation of the EGR 1. As mentioned above, the malfunction determination is a process for determining whether or not the EGR valve 4 is in a fixed state where the EGR valve 4 is fixed to be in an open state. Thus, the malfunction determining process must be performed under the condition in which the ECU 8 controls the EGR valve 4 to close the valve.

Accordingly, if a negative determination is made in step 22, that is, if the ECU 8 controls the EGR valve 4 to open, the process proceeds to step 26 so as to clear the malfunction determining opportunity counter ECDEGOF since the malfunction determining process cannot be performed. The process is then returned to step 10.

On the other hand, if an affirmative determination is made in step 22, the process proceeds to step 24 where it is determined whether or not the above-mentioned EGRON history flag XJEGON is set (XJEGON=ON). As mentioned above, the EGRON history flag indicates an operational history of the EGR valve 4 that the EGR valve 4 was operated at least one time. Additionally, as described with reference to FIGS. 5 and 6, if the determination of occurrence of malfunction is made before the EGR valve is operated, is it possible to make an erroneous determination and, thus, an accurate determination of occurrence of malfunction cannot be achieved.

Accordingly, if the negative determination is made in step 24, that is, if there is no history indicating an operation of the EGR valve 4, it is possible that an accurate determination cannot be made. Thus, in such a case, the process proceeds to step 26 so as to clear the malfunction determining opportunity counter ECDEGON, and then the process is returned to step 10.

On the other hand, if an affirmative determination is made in step 24, the process proceeds to step 28 where it is determined whether or not a predetermined delay time t3 has elapsed. The delay time t3 is a time period corresponding to a single step of the malfunction determining opportunity counter ECDEGOF shown in FIG. 6-(B). That is, the passage of delay time t3 is waited in step 24, and then the process proceeds to step 30.

In step 30, the malfunction determining process is performed. The malfunction determining process performed in step 30 is shown in FIG. 4. When the malfunction determining process of step 30 is completed, the process proceeds to step 32 where the malfunction determining opportunity counter ECDEGOF used in step 14 and the counter used in step 16 are cleared, and then the process is ended.

As mentioned above, in the start condition determining process according to the present embodiment, the EGRON history flag XJEGON is provided, in step 12, to indicate the operation history of the EGR valve 4. Then, the malfunction determining process is performed, in step 30, only when it is determined, in step 24, that the operation history is present based on the EGRON history flag XJEGON. Thus, an erroneous determination can be prevented, and an accurate determination of occurrence of malfunction can be performed.

A description will now be given, with reference to mainly FIGS. 4 and 7, of the malfunction determining process of the EGR 1 performed in step 30. As mentioned above, FIG. 4 is a flowchart of the malfunction determining process, and FIG. 7 shows an example of an operation of the EGR 1 in which the malfunction determining process is performed. In FIG. 7, (A) indicates a vehicle speed SPD which is obtained from the output of the vehicle speed sensor 39. Additionally, (B) indicates a counter (hereinafter referred to as IDLON counter) which is provided in the ECU 8 and is started when the engine is in an idle state an movement of the vehicle is stopped. Further, (C) indicates a target valve opening degree ETLIFTD which is set in response to a condition of the engine. The target valve opening degree ETLIFTD is calculated by ECU 8. Additionally, (D) indicates a target valve opening degree blunted value ETLIFTDD which is a blunted value of the target valve opening degree ETLIFTD. Further, (E) indicates an actual degree (actual valve opening degree) of opening of the EGR valve which is obtained from the output of the lift sensor 19.

The malfunction determining process shown in FIG. 4 is started after the EGR valve is operated and conditions for determining the start of the malfunction determination in steps 16 to 22 are satisfied, as is apparent from the description with reference to FIG. 3. When the malfunction determining process is started, it is determined, in step 300, whether or not a normal determining history flag XNORMAL is set (XNORMAL=ON).

The normal determining history flag XNORMAL is a flag which is set when it is determined, in the step 300 described later, that the operation of the EGR 1 is normal. Accordingly, it can be determined whether or not a normal determination, which indicates that the operation of the EGR 1 is normal, was made in a previous malfunction determining process by checking the status of the normal determining history flag XNORMAL. It should be noted that the reason for providing the step 300 will be described later for the sake of convenience. If a negative determination is made in step 300, the process proceeds to step 302. In step 302, it is determined whether or not the engine 2 is in an idle state and also if a time period during which the vehicle is stopped exceeds a predetermined time period t4. Similar to the above-mentioned step 18, it can be determined by the output of the throttle switch 54 whether or not the engine 2 is in an idle state. Additionally, it can be determined by the output signal of the vehicle speed sensor 39 whether or not the vehicle is in a stop state.

In step 302, a wait occurs for the passage of the time period t4 while the engine is in an idle state and the vehicle is in a stopped state. This is because, immediately after the vehicle is stopped from the moving state and the engine assumes an idle state, it is possible that the EGR valve 4 is not fully opened even if the EGR 1 is normal.

That is, as mentioned above, the EGR valve 4 is operated by switching the negative pressure in the intake line and the atmospheric air in the VSV 5 which is controlled by the ECU 8. Thus, there is a delay in the operation from the time when the ECU 8 outputs a signal for opening the EGR valve 4 to the time when the EGR valve 4 is actually opened. Accordingly, it is possible that if the determination of occurrence of malfunction is performed during the delay of operation, an erroneous determination is made. The time period t4 is set in response to the delay in operation. Accordingly, in step 302, the determination of occurrence of malfunction is not performed immediately after the engine idle state and the vehicle is in a stopped state. The process after step 304 is performed after waiting for the time period t4.

In the present embodiment, the passage of the time period t4 is determined by the IDLON counter which is indicated in FIG. 7-(B). As mentioned above, the IDLON counter is a counter which counts when the engine is in an idle state and the vehicle is in a stopped state. Thus, the passage of the time period t4 can be determined based on the IDLON counter. It should be noted that the time T1 in FIG. 7 indicates the time when the time period t4 has elapsed.

If an affirmative determination is made in step 302, the process proceeds to step 304 so as to wait for a start of the vehicle. Then, the process proceeds to step 306 when the vehicle is started. It should be noted that the determination as to whether or not the vehicle is started can be made based on the output signal of the vehicle speed sensor 39. In the example of FIG. 7, the vehicle is started at the time T2.

In step 306, it is determined for the first time whether or not the EGR 1 is operated. Specifically, in step 306, it is determined for the first time whether or not the EGR 1 is operated after the time period t4 is elapsed (step 302) during which the engine is in an idle state and the vehicle is in a stopped state. If the affirmative determination is made in step 306, the process after step 308 is performed which is an essential process for determining an occurrence of malfunction. Owing to the process of step 306, an operation of the EGR 1 can be started under the condition in which the operation of the engine is stable. It should be noted that, in the example of FIG. 7, the EGR 1 is operated for first time at the time T3.

When an operation of the EGR 1 is started, the ECU 8 starts the EGR control process. FIG. 11 is a flowchart showing the EGR control process. A description will now be given, with reference to FIG. 11, of the EGR control process performed by the ECU 8. It should be noted that the EGR control process is separately performed form the malfunction determining process shown in FIG. 4.

When the EGR control process shown in FIG. 11 is started, the ECU reads, in step 400, the operating conditions of the engine 2 based on various sensors. Then, in step 402, the ECU 8 calculates a degree of opening (target valve opening degree ETLIFTDD) of the EGR valve 4 which is optimum for the operating conditions of the engine 2 that was read in step 400.

In step 404, a blunt process is performed by a known method with respect to the target valve opening degree ETLIFTD calculated in step 402 so as to obtain the target valve opening degree blunted value ETLIFTDD. It should be noted that step 404 is provided for performing the malfunction determining process, and the detail will be described later.

In step 406, the operation of the SVS 5 is controlled based on the target valve opening degree ETLIFTD obtained in step 402 and the actual valve opening degree ELIFTD of the EGR valve 4 which was calculated by the output signal of the lift sensor 19. A feedback control is performed so that the actual valve opening degree ELIFTD of the EGR valve 4 becomes equal to the target valve opening degree ETLIFTD. Thereby, the EGR valve 4 is controlled to be at an optimum degree of opening. Thus, an appropriate amount of exhaust gas is returned to the intake passage 9 via the exhaust gas recirculating passage 3 so as to reduce NOx. In step 408, an EGR start flag XAEGR is set which indicates that an operation of the EGR 1 is started (EGR ON) by the ECU 8, and then the process is ended. It should be noted that the above-mentioned EGR process is repeatedly performed for predetermined periods.

Returning now to FIG. 4, the description of the malfunction determining process is continued.

If an affirmative determination is made in step 306, the process proceeds to step 308. In step 308, the target valve opening degree ETLIFTD, the target valve opening blunted value ETLIFTDD and the actual valve opening degree ETLIFTD are read at the time T3 when the EGR is first operated after the time period t4 has passed during which the engine is in an idle state and the vehicle is in a stopped state. The target valve opening degree ETLIFTD, the target valve opening blunted value ETLIFTDD and the actual valve opening degree ETLIFTD are stored in the ROM 41 as a reference target valve opening degree ETLIFTD1, a reference target valve opening blunted value ETLIFTDD1 and a reference actual valve opening degree ETLIFTD1, respectively.

The target valve opening degree ETLIFTD is calculated in step 402 of the EGR control process shown in FIG. 11. The target valve opening degree blunted value ETLIFTDD is calculated in step 404 of the EGR control process shown in FIG. 11. The actual valve opening degree ELIFTD is obtained from the output of the lift sensor 19. The reference target valve opening degree ETLIFTD1, the reference target valve opening blunted value ETLIFTDD1 and the reference actual valve opening degree ETLIFTD1 correspond to the target valve opening degree ETLIFTD, the target valve opening blunted value ETLIFTDD and the actual valve opening degree ETLIFTD at the time T3, respectively, as shown in FIG. 7-(C), (D) and (E).

In step 310, it is determined whether or not a difference (ETLIFTD−ETLIFTD1) between the target valve opening degree ETLIFTD and the reference target valve opening degree ETLIFTD11 is equal to or greater than a predetermined value α. If an affirmative determination is made in step 310, the process proceeds to step 312. It is determined, in step 312, whether or not the difference (ELIFTD−ELIFTD1) between the actual valve opening degree ELIFTD and the reference actual valve opening degree ELIFTD1 is equal to or greater than a predetermined value β. If it is determined, in step 312, that the difference (ELIFTD−ELIFTD1) is equal to or greater than the predetermined value β, a determination in made in step 314 that the EGR 1 is normal.

A description will now be given of the reason why it can be determined that the EGR 1 is normal when the above-mentioned determinations in steps 308 to 312 are made.

As mentioned above, the target valve opening degree ETLIFTD is calculated by the ECU 8 in response to the operating conditions of the vehicle, and indicates the valve opening degree of the EGR valve 4 which is optimum for the operating conditions. Accordingly, the ECU 8 controls the operation of the EGR valve 4 via the VSV 5 so that the actual valve opening degree ELIFTD becomes equal to the target valve opening degree ETLIFTD.

Supposing that a malfunction occurs in the VSV 5 or the EGR valve 4 which constitutes the EGR 1, the EGR valve 4 does not operate when the ECU 8 controls the EGR valve to operate. On the other hand, since the target valve opening degree ETLIFTD is calculated by the ECU 8, it can be calculated even when a malfunction occurs in the EGR 1. Accordingly, when a malfunction occurs in the EGR 1, the target valve opening degree ETLIFTD varies in accordance with operating conditions whereas the actual valve opening degree ELIFTD of the EGR valve 4 does not vary.

Considering the above-mentioned phenomenon, in the present embodiment, it is determined that the EGR valve 4 is normal when the actual valve opening degree ELIFTD is changed in response to the change in the target valve opening degree by the predetermined valve α.

Additionally, in the present embodiment, the determination of occurrence of malfunction is not based on a difference between the target valve opening degree and the actual valve opening degree as is in the conventional method but the determination is based on the difference (ELIFTD−ELIFTD1) between the actual valve opening degree ELIFTD and the reference actual valve opening degree ELIFTD1 when the target valve opening degree ETLIFTD is changed by a value greater than the predetermined valve α from the reference target valve opening degree ETLIFTD1. That is, in the present embodiment, the determination of occurrence of malfunction is performed based on the absolute value (ELIFTD−ELIFTD1) of the change in the actual valve opening degree. The reason for this is described below.

As mentioned above, since the target valve opening degree ETLIFTD is calculated in accordance with operating conditions of the engine 2, the target valve opening degree continuously changes due to change in the operating conditions of the engine 2. On the other hand, since the EGR valve 4 is controlled by using the VSV 5, the actual valve opening degree ELIFTD cannot follow or respond to the target valve opening degree ETLIFTD without delay. Accordingly, it is possible that an accurate determination of malfunctioning cannot be made in the conventional method in which the determination of malfunctioning is made based on the actual valve opening degree ELIFTD and the target valve opening degree ETLIFTD since both the actual valve opening degree ELIFTD and the target valve opening degree ETLIFTD include a variation factor.

On the other hand, in the malfunction determining process according to the present embodiment, the change in the target valve opening degree ETLIFTD does not directly influence the determination of malfunctioning since target valve opening degree is used only for setting a timing for performing the determination of a malfunction. Additionally, even if the delay in response of the operation of the EGR valve 4 is generated, the delay is canceled when the difference (ELIFTD−ELIFTD1) is calculated since the determination of a malfunction is performed based on the absolute value (the difference: ELIFTD−ELIFTD1) of the actual valve opening degree ELIFTD which is obtained from the reference actual valve opening degree ELIFTD1. Thus, in the malfunction determining process according to the present embodiment, the influence of the delay in response of the EGR valve 4 to the malfunction determining process can be prevented, and thus an accurate determination of malfunctioning can be made.

Returning now to FIG. 4 to continue the description of the process. When the determination that the EGR 1 is normal is made in step 314, the process proceeds to step 316 where the normal determination history flag XNORMAL is set (XNORMAL=ON). That is, the normal determination history flag XNORMAL is set only when the EGR 1 is determined to be normal in step 314.

A reference is now made to the above-mentioned step 300. In step 300, the process is ended without performing the malfunction determining process after step 302 when the normal determination history flag XNORMAL is set. That is, once the normal determination was made in step 300, the execution of the process after step 302 is prohibited until the next time the engine 2 is started. The reason for this is described below.

The malfunction determining process is performed based on various parameters such as the above-mentioned target valve opening degree ETLIFTD, the target valve opening degree blunted value ETLIFTDD, the actual valve opening degree ELIFTD, the reference target valve opening degree ETLIFTD1, the reference target valve opening degree blunted value ETLIFTDD1 and the reference actual valve opening degree ELIFTD1. Each of the parameters is calculated based on the output signals output from the lift sensor 19 and various sensors which detects operating conditions of the engine 2. It is possible that external noise can intrude into each of these sensors. If the external noise intrudes and an erroneous signal is generated, an accurate determination may not be performed.

Accordingly, in the structure in which the malfunction determining process is continued after once the normal determination was made, it is possible that the EGR control process cannot be appropriately performed when the above-mentioned intrusion of external noise occurs since the malfunction determining process is performed despite the EGR 1 being normal. Thus, in the present embodiment, when the normal determination that the EGR 1 is normal is made in step 314, the normal history flag XNORMAL is set (XNORMAL=ON) in step 316, whereas the malfunction determining process after step 302 is not performed when the normal determination flag XNORMAL is set in the process of step 300. Accordingly, accuracy of the malfunction determining process can be increased. It should be noted that the malfunction determining process is ended when the process of step 316 is completed.

The above description is for the process when it is determined, in step 312, that the difference (ELIFTD−ELIFTD1) between the actual valve opening degree ELIFTD and the reference actual valve opening degree ELIFTD1 is equal to or greater than the predetermined value β, that is, when it is determined that the EGR 1 is normal. On the other hand, if a negative determination is made in step 312, the process proceeds to step 318.

In step 318, it is determined whether or not the EGR 1 is continuously operated for a predetermined time period t5. The process of step 318 is provided to let the delay time pass so as to prevent influence of the delay in response of the EGR valve 4 when the malfunction determining process is performed, in step 318, based on the target valve opening degree blunted value ETLIFTDD. If the negative determination is made in step 318, the process returns to step 310.

On the other hand, if an affirmative determination is made in step 318, the process proceeds to step 320. In step 320, it is determined whether or not the difference (ETLIFTDD−ETLIFTDD1) between the target valve opening blunted value ETLIFTDD and the reference target valve opening degree ETLIFTDD1 is equal to or greater than a predetermined value τ. If an affirmative determination is made in step 320, the process proceeds to step 322. On the other hand, if a negative determination is made, the process returns to step 310.

In step 322, the malfunction determining counter CDEGOF is incremented. Then, in step 324, it is determined whether or not the malfunction determining counter CDEGOF is equal to or greater than a predetermined value X. If it is determined, in step 324 that the malfunction determining counter is equal to or greater that the predetermined value X (CDGOE≧X), the process proceeds to step 326 to make a determination that the EGR 1 is malfunctioning.

It should be noted that, steps 322 and 324 are provided, and the determination of malfunctioning in step 324 is not made immediately after the determination of malfunctioning is made in steps 310 to 312. The determination of malfunctioning in step 24 is made when the malfunction determining counter CDEGOF becomes equal to or greater than the predetermined value X. The reason for this is to prevent a determination of malfunctioning when an erroneous determination is made due to intrusion of external noise.

As apparent from the above description, in the malfunction determining process according to the present invention, the determination of malfunctioning is not made immediately after the processes of steps 310 and 312 resulted in the difference (ETLIFTD−ETLIFTD1) between the target valve opening degree ETLIFTD and the reference target valve opening degree ETLIFTDD being equal to or greater than the predetermined value α and the difference (ELIFTD−ELIFTD1) between the actual valve opening degree ELIFTD and the reference valve opening degree ELIFTD1 is equal to or greater than the predetermined value β. That is, the process for malfunctioning in steps 322 to 326 is initiated when it is determined, in step 320, that the difference (ETLIFTDD−ETLIFTDD1) between the target valve opening degree blunted value ETLIFTDD and the reference target valve opening degree ETLIFTDD1 is equal to or greater than the predetermined value τ.

In the malfunction determining process according to the present embodiment, the process for determining occurrence of malfunction is performed when the changes in the target valve opening degree and the target valve opening degree blunted value are equal to or greater than the predetermined values α and τ, respectively, and when the change in the actual valve opening degree is less than the predetermined value β.

Figure 8:
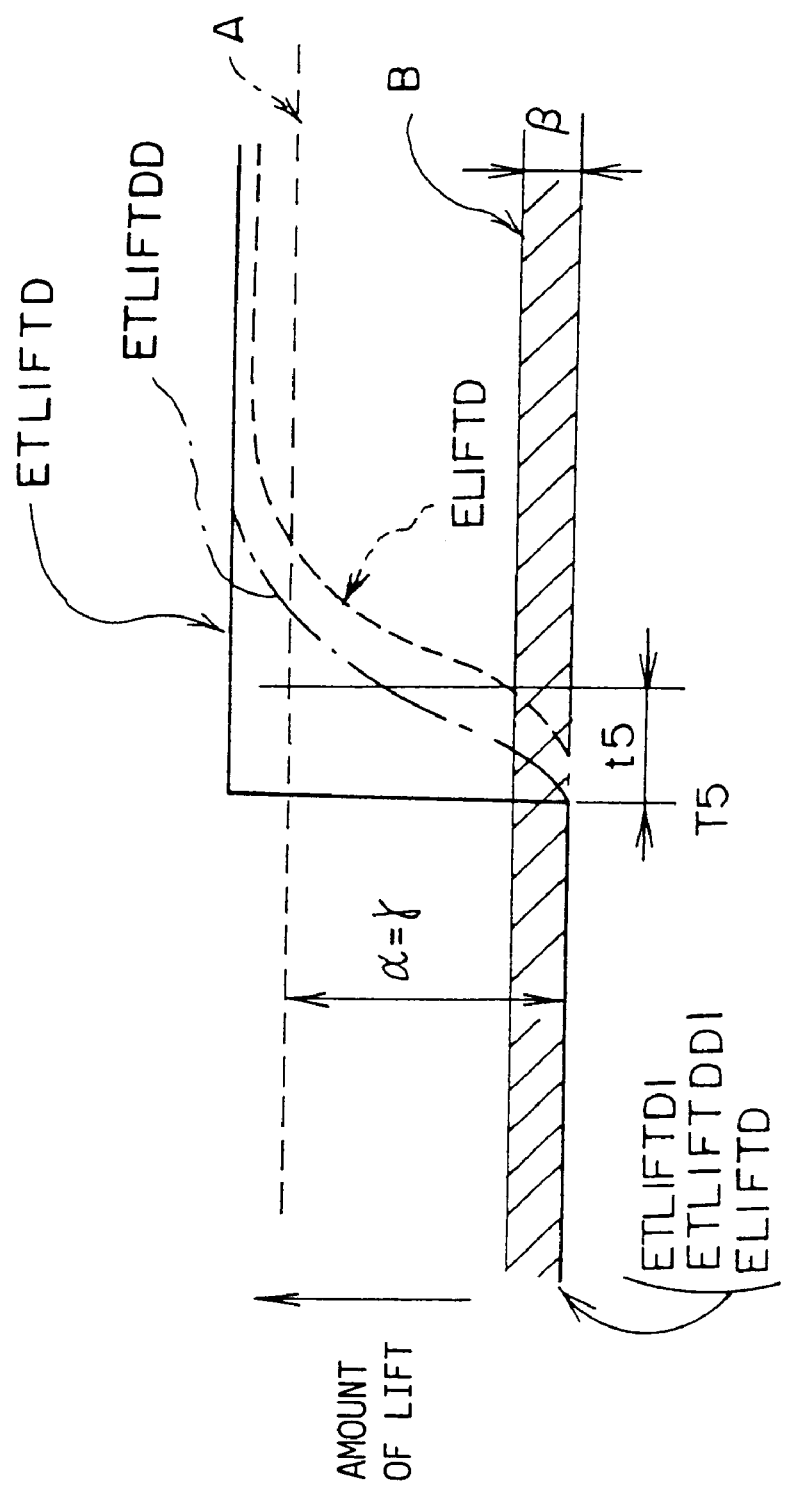
FIG. 8 is an illustration for explaining a reason for using a blunted amount of a target lift in the malfunction determining process according to the present invention.
Figure 9:
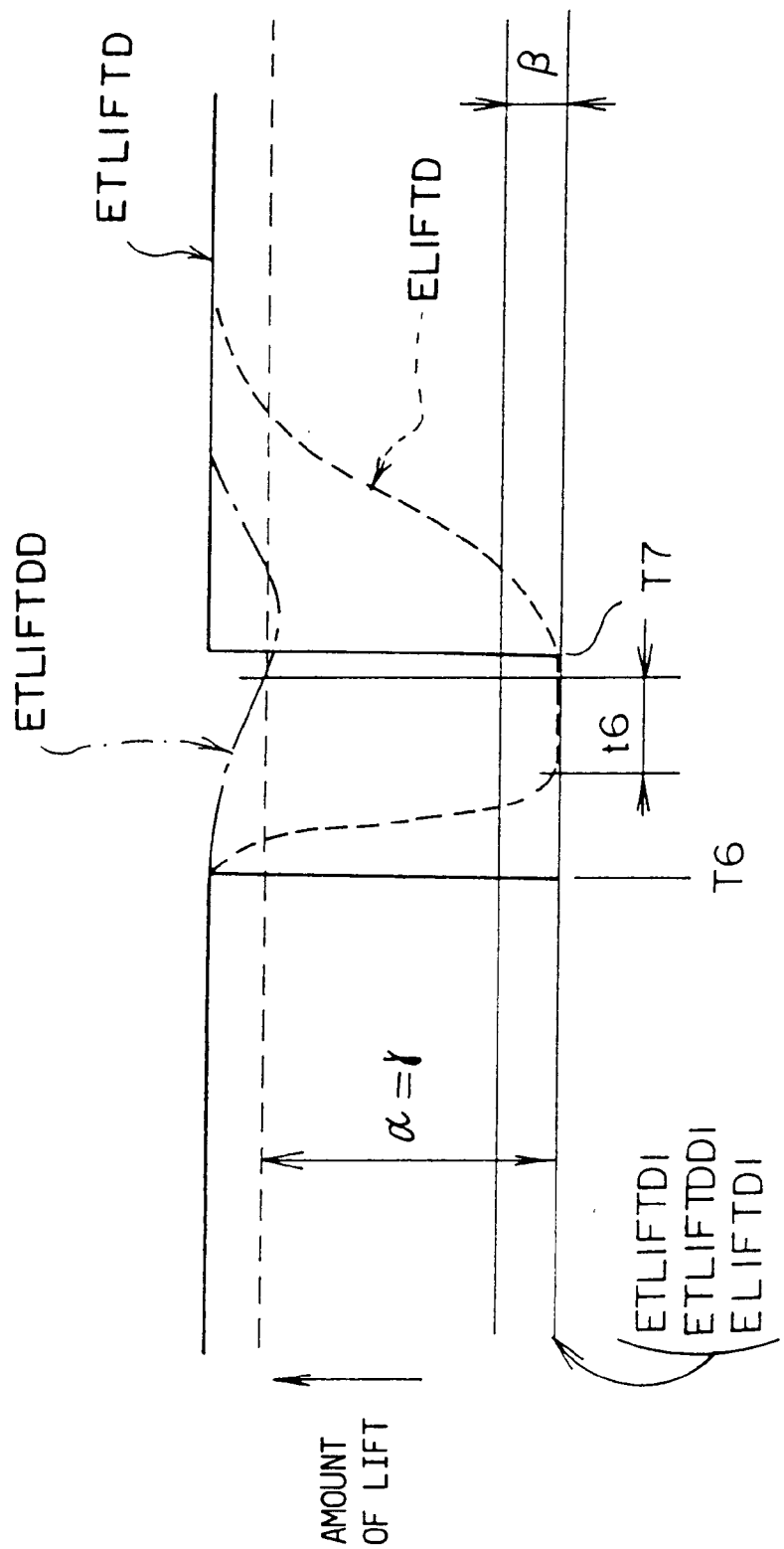
FIG. 9 is an illustration for explaining a reason for using both an amount of target lift and the blunted amount of the target lift.

A description will now be given, with reference to FIGS. 8 and 9, of the reason for the above-mentioned procedure. FIGS. 8 and 9 are illustrations in which the target valve opening value ETLIFTD, the target valve opening degree blunted value ETLIFTDD and the actual valve opening value ELIFTD are indicated in an overlapping relationship for the sake of convenience. Additionally, the reference target valve opening degree ETLIFTD1, the reference target valve opening blunted value ETLIFTDD1 and the reference actual valve opening degree ELIFTD1 are indicated in the figures as they are the same value. Further, The predetermined value α in step 310 and the predetermined value τ in step 320 are indicated by a dashed line indicated by an arrow A (in example of the figure, a=τ). The predetermined value β in step 312 is indicated by a solid line indicated by an arrow B.

As mentioned above, since the target valve opening value ETLIFTD is calculated by the ECU 8, the ECU 8 sets the target valve opening value ETLIFTD immediately after it is calculated. A time T5 shown in FIG. 8 indicates the time when the ECU 8 sets the target valve opening degree ETLIFTD. Since the target valve opening degree ETLIFTD is set by an electrical process by the ECU 8, the target valve opening degree ETLIFTD has a characteristic in that a sharp increase occurs at the time T5. Thus, for the sake of simplification in FIG. 8, the change in the target valve opening degree ETLIFTD is indicated by a square form.

Additionally, in the example in the figures, it is assumed that difference (ETLIFTD−ETLIFTD1) between the target valve opening degree ETLIFTD and the reference target valve opening degree ETLIFTD1 is equal to or greater than the predetermined value α. That is, the condition is achieved where the affirmative determination is made in step 310.

On the other hand, referring to the actual valve opening degree ETLIFTD, since there is the delay of response in an operation of EGR valve 4 as mentioned above, the change in the actual valve opening degree ELIFTD is delayed with respect to the change in the target valve opening degree ETLIFTD.

Thus, in a structure in which the malfunction determining process is performed based on the amount of change in the actual valve opening degree (difference: ELIFTD−ELIFTD1) when the amount of change (difference: ETLIFTD−ETLIFTD1) in the target valve opening degree ETLIFTD is equal to or greater than the predetermined value α, that is, when the determination of malfunctioning is performed only by the process of steps 310 and 312, it is possible that the amount of change (difference: ELIFTD−ELIFTD1) in the actual valve opening degree ELIFTD is less than the predetermined value β during the time period t5 shown in FIG. 8 despite the EGR 1 being normal. Thus, if a determination is performed during the time period t5, it is possible to make an erroneous determination.

On the other hand, since the target valve opening degree blunted value ETLIFTDD is a blunted or filtered value of the target valve opening degree ETLIFTD, the target valve opening degree blunted value ETLIFTDD is closer to the actual valve opening degree ELIFTD than the target valve opening degree ETLIFTD. Thus, an occurrence of an erroneous determination due to the delay in response mentioned above can be prevented by performing the determination of malfunctioning when the amount of change (difference: ETLIFTDD–ETLIFTDD1) in the target valve opening degree blunted value is equal to or greater than the predetermined value τ.

On the other hand, if the time for initiating the malfunction determining process is set based on the target valve opening degree ETLIFTDD alone, the following problem may be raised. If the target valve opening degree ETLIFTD sharply changes at a time T6 from a certain value (for example, zero) and then returns to the certain value at a time T7 as shown in FIG. 9, such a change cannot be reflected to the target valve opening degree blunted value ETLIFTDD. Thus, it is possible that the target valve opening degree blunted value may be maintained at a greater value than the predetermined value τ for the time period t6.

Additionally, since the EGR valve 4 is controlled so that the actual valve opening degree ELIFTD becomes equal to the target valve opening degree ETLIFTD, it is possible that the actual valve opening degree ELIFTD becomes equal to zero (closed state) during the time period (from time T6 to time T7) when the target valve opening degree ELIFTD is zero. If the time for initiating the malfunction determining process is set based on the target valve opening degree blunted value ETLIFTDD alone, the determination of malfunctioning is performed under the above-mentioned condition. Accordingly, an erroneous determination may be made that the EGR 1 is malfunctioning since the amount of change (difference: ELIFTD–ELIFTD1) in the actual valve opening degree ELIFTD is regarded as less than the predetermined value β despite the actual valve opening degree ELIFTD being zero due to a normal operation of the EGR valve 4.

Accordingly, in the present embodiment, steps 310 and 320 are provided so that the malfunction determining process after step 322 is performed when the two conditions are established that the amount of change (difference: ETLIFTD–ETLIFTD1) in the target valve opening degree ETLIFTD is equal to or greater than the predetermined value α and the amount of change (difference:ETLIFTDD–ETLIFTDD1) is equal to or greater than the predetermined value τ, and further when it is determined, in step 312, that the difference (ELIFTD–ELIFTD1) is less than the predetermined value β. From this procedure, the above-mentioned erroneous determination is prevented, and thus an accurate malfunction determining process can be performed.

In the above-mentioned present embodiment, when the determination that the apparatus is normal is made in the process in steps 310 and 312, the malfunction determining process using the target valve opening degree blunted value in step 320 is not performed. That is, when the determination of normal is made in the process of steps 310 and 312, the determination of normal is made irrespective of the change in the target valve opening degree blunted value ETLIFTDD. The reason for this is described below with reference to FIG. 10.

It is assumed that the engine 2 is operated in a a high load condition. As mentioned above, since the EGR valve 4 is operated by the intake negative pressure in the intake passage 9, if the throttle valve 11 is fully opened due to the high load operation, the intake negative pressure is decreased which leads to a state where the intake pressure is equal to the atmospheric pressure.

Figure 10:
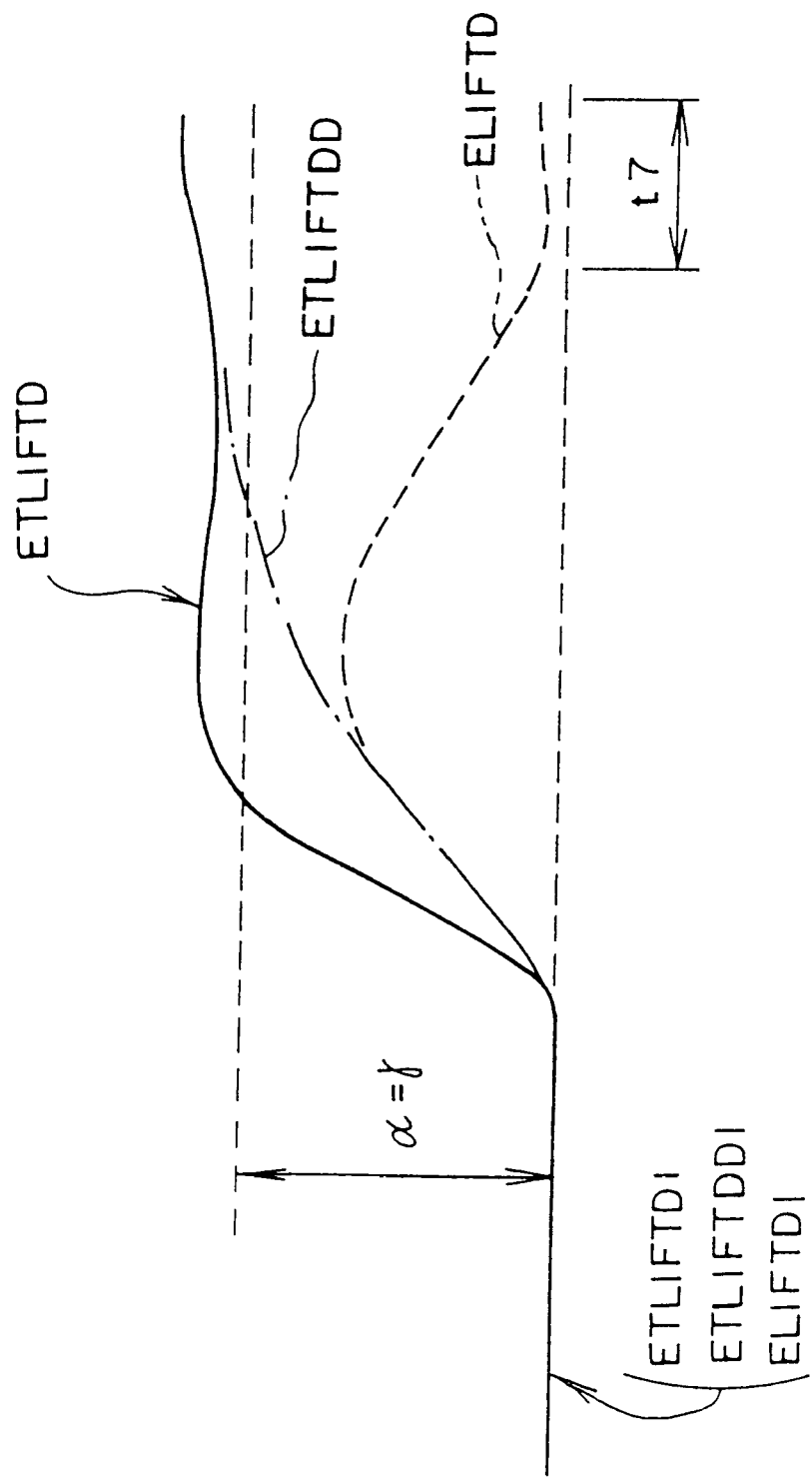
FIG. 10 is an illustration for eliminating a problem which may occur in a high-loaded condition in the malfunction determining process according to the present invention.

In such a condition, the EGR valve 4, which is driven by the intake negative pressure, cannot be operated properly. Thus, the reference actual valve opening degree shifts toward the fully closed state as shown in FIG. 10. However, since the target valve opening value ETLIFTD and the target valve opening degree blunted value ETLIFTDD are set by the calculation of the ECU 8, it is possible that the amount of changes in the target valve opening degree ETLIFTD and the target valve opening degree blunted value ETLIFTDD are greater than the predetermined values when the EGR valve 4 is in the closed state due to the operating conditions of the engine 2.

Accordingly, if the malfunction determining process is performed during a period (a period indicated by t7 in FIG. 10) in which the reference actual valve opening degree ELIFTD1 of the EGR valve 4 is zero due to operating conditions of the engine 2, it is possible that an erroneous determination is made that the EGR 1 is malfunctioning as the amount of change (difference:ELIFTD–ELIFTD1) in the actual valve opening degree ELIFTD is less than the predetermined value β despite the EGR 1 performing a normal operation.

However, even if the apparatus is operated in the above-mentioned condition, the EGR valve 4 always operates to some degree when an operation of the EGR 1 is initiated and the target valve opening degree ETLIFTD is established. This operation can be detected by the lift sensor 19. That is, even if the engine is in a high-load condition, it can be determined that the EGR 1 is normal if the amount of change in the actual valve opening degree ELIFTD is greater than a predetermined value when the amount of change in the target valve opening degree is greater than a predetermined value,.

On the other hand, since the target valve opening degree blunted value ETLIFTDD is raised with a delay with respect to the target valve opening degree ETLIFTDD, if the initiation of the malfunction determining process is delayed till the amount of change (ETLIFTDD–ETLIFTDD1) has become equal to or greater than the predetermined value τ, it is possible that the engine 2 goes into a high-loaded condition during that period.

Accordingly, in this embodiment, the target valve opening degree blunted value ETLIFTDD is not used as a parameter for determination of a normal operation. The EGR 1 is determined to be normal if the amount of change (difference: ELIFTD–ELIFTD1) of the actual valve opening degree ELIFTD is equal to or greater than the predetermined value β when the amount of change (ETLIFTD–ETLLIFTD1) of the target valve opening degree ETLIFTD is equal to or greater than the predetermined value α in the process of step 310 and 312.

It should be noted that, in the above-mentioned embodiment, steps 10, 12 and 24 in FIG. 3 correspond to means for determining whether the exhaust gas recirculating valve is operated at least once. Additionally, steps 310, 312 and 320 in FIG. 4 correspond to means for determining malfunction.

Additionally, in the above-mentioned embodiment, the amount of change with respect to the actual valve opening degree, the target valve opening degree and the target valve opening degree blunted value is obtained as the "difference" from the reference values, the amount of change may be represented by a "ratio" to perform a similar process.

Further, in the above-mentioned embodiment, means for detecting the operating conditions of the valve is not limited to a method in which the valve opening degree is directly detected. For example, a temperature in the EGR passage can be detected and the operating condition of the valve can be detected by a temperature in the EGR passage.

The present invention is not limited to the specifically disclosed embodiments, and variations and modifications may be made without departing from the scope of the present invention.

What is claimed is:

1. A malfunction determining apparatus of an exhaust gas recirculation system having an exhaust gas recirculating valve provided between an exhaust passage and an intake passage of an internal combustion engine of a vehicle, said malfunction determining apparatus comprising:

means for detecting an actual degree of opening of said exhaust gas recirculating valve;

means for determining whether said exhaust gas recirculating valve has been operated at least once; and means for determining whether said exhaust gas recirculation system is malfunctioning based on the actual degree of opening of said exhaust gas recirculating valve after said exhaust gas recirculating valve has been operated at least once.

2. The malfunction determining apparatus as claimed in claim 1, further comprising start condition determining means for determining an appropriate condition to start a malfunction determining process to make said determination of malfunctioning based on operating conditions of said internal combustion engine and said vehicle.

3. The malfunction determining apparatus as claimed in claim 2, wherein said start condition determining means determines whether said internal combustion engine has been operated for a predetermined period so as to start said malfunction determining process after said internal combustion engine has been operated for said predetermined period.

4. The malfunction determining apparatus as claimed in claim 2, wherein said start condition determining means determines whether said internal combustion engine is in an idle operation and said vehicle is a stopped state so as to start said malfunction determining process when said internal combustion engine is in an idle operation and said vehicle is in said stopped state.

5. The malfunction determining apparatus as claimed in claim 2, wherein said start condition determining means determines whether a cooling water temperature of said internal combustion engine is one of equal to and greater than a predetermined temperature so as to start said malfunction determining process when the cooling water temperature of said internal combustion engine is one of equal to and greater than said predetermined temperature.

6. The malfunction determining apparatus as claimed in claim 2, wherein said start condition determining means determines whether said exhaust gas recirculating valve is controlled to be in a closed state so as to start said malfunction determining process when said exhaust gas recirculating valve is controlled to be in said closed state.

* * * * *

UNITED STATES PATENT AND TRADEMARK OFFICE
CERTIFICATE OF CORRECTION

PATENT NO. : 5,943,999

DATED : August 31, 1999

INVENTOR(S) : Masatomo YOSHIHARA and Tokiji ITO

It is certified that error appears in the above-indentified patent and that said Letters Patent is hereby corrected as shown below:

Column 8, line 21, change "to" to -- two --;

Column 15, line 35, change "(CDGOE ..." to --(CDEGOF--;

Column 18, line 43, change "... -ETLLIFTD1)" to --... -ETLIFTD1)--.

Column 20, line 7, after "is" insert -- in --.

Signed and Sealed this

Thirteenth Day of March, 2001

Attest:

NICHOLAS P. GODICI

Attesting Officer

Acting Director of the United States Patent and Trademark Office